US008505790B2

(12) United States Patent
Yu et al.

(10) Patent No.: US 8,505,790 B2
(45) Date of Patent: Aug. 13, 2013

(54) METHOD AND APPARATUS FOR ATTACHING A PERSONAL ELECTRONIC DEVICE

(76) Inventors: David Chen Yu, Laguna Niguel, CA (US); Michael David Yu, Laguna Niguel, CA (US)

( * ) Notice: Subject to any disclaimer, the term of this patent is extended or adjusted under 35 U.S.C. 154(b) by 397 days.

(21) Appl. No.: 13/072,340

(22) Filed: Mar. 25, 2011

(65) Prior Publication Data
US 2011/0297711 A1 Dec. 8, 2011

Related U.S. Application Data

(63) Continuation-in-part of application No. 12/795,327, filed on Jun. 7, 2010, now Pat. No. 8,267,294.

(51) Int. Cl.
*A45F 5/00* (2006.01)

(52) U.S. Cl.
USPC ............................ 224/185; 224/625; 224/930

(58) Field of Classification Search
USPC .................. 224/197, 623, 606, 625, 270, 930, 224/910, 922, 261, 262, 661, 925, 929, 185; 361/679.03; 84/421; 348/825; 455/575.6; 379/449; 396/420–426; D14/250–253, 447, D14/192; 248/924
See application file for complete search history.

(56) References Cited

U.S. PATENT DOCUMENTS

| | | | | |
|---|---|---|---|---|
| 4,156,512 A * | 5/1979 | Brown | ........................... | 248/586 |
| 4,394,075 A * | 7/1983 | Brown et al. | ................. | 352/243 |
| 4,637,536 A * | 1/1987 | Wong | ............................. | 224/262 |
| 5,187,744 A * | 2/1993 | Richter | ........................ | 379/449 |
| 5,207,791 A * | 5/1993 | Scherbarth | ................ | 273/148 B |
| 5,323,195 A * | 6/1994 | Phillips | ......................... | 396/422 |
| 5,503,313 A * | 4/1996 | Wei | ................................ | 224/197 |
| 5,664,750 A * | 9/1997 | Cohen | ...................... | 248/231.71 |
| 5,673,628 A * | 10/1997 | Boos | ............................... | 108/44 |
| 6,137,675 A * | 10/2000 | Perkins | .................... | 361/679.03 |
| 6,345,751 B1 * | 2/2002 | Elliot | ............................ | 224/646 |
| 6,359,609 B1 * | 3/2002 | Kuenster et al. | ............. | 345/156 |
| 7,611,112 B2 * | 11/2009 | Lin | ............................. | 248/274.1 |
| 7,665,641 B2 * | 2/2010 | Kaufman | ...................... | 224/261 |
| 8,066,241 B2 * | 11/2011 | Yu et al. | ..................... | 248/286.1 |
| D650,774 S * | 12/2011 | Molter | ........................ | D14/239 |
| 8,142,083 B2 * | 3/2012 | Brown | ......................... | 396/421 |
| 8,235,334 B1 * | 8/2012 | Kobal | ........................ | 248/122.1 |
| 8,240,628 B2 * | 8/2012 | Huang | ........................ | 248/316.1 |
| 8,267,294 B2 * | 9/2012 | Yu et al. | ......................... | 224/623 |
| 8,308,392 B2 * | 11/2012 | Yu et al. | ......................... | 403/129 |
| 8,413,943 B1 * | 4/2013 | Li | .................... | 248/454 |
| 8,418,900 B1 * | 4/2013 | Baker | .......................... | 224/262 |
| 8,424,825 B2 * | 4/2013 | Somuah | ..................... | 248/316.4 |
| 2011/0259771 A1 * | 10/2011 | Johnson | ........................ | 206/320 |
| 2011/0303710 A1 * | 12/2011 | Yu | ................................ | 224/219 |

* cited by examiner

*Primary Examiner* — Justin Larson

(57) ABSTRACT

Systems and methods for supporting an electronic device include an electronic device storage chamber; a shoulder strap attached to a top end of the electronic device storage chamber; a chest strap attached to a surface of the electronic device storage chamber; a bottom arm hingeably attached to a bottom end of the electronic device storage chamber; a ball joint attached to the bottom arm; and an electronic device support arm having a first end attached to the ball joint. In one embodiment, a phone arm can be attached to a surface of the electronic device storage chamber to adjustably support the position of a phone so that a user can simultaneously use the phone and the electronic device such as a tablet in a hands-free manner.

18 Claims, 8 Drawing Sheets

METHOD AND APPARATUS FOR ATTACHING A PERSONAL ELECTRONIC DEVICE

This application is a continuation-in-part (CIP) of application Ser. No. 12/795,327, filed on Jun. 7, 2010, which issued as U.S. Pat. No. 8,267,294 on Sep. 18, 2012, the content of which is incorporated by reference.

BACKGROUND OF THE INVENTION

The present invention pertains to a method and apparatus for attaching a personal electronic device.

Personal electronic devices have become extremely popular, providing on-the-go entertainment and data access. While many devices are hand-held size, the popularity of these devices has led to the introduction of larger tablet-style devices with larger screens. These larger devices may also allow a user to access the Internet using a keyboard appearing on the screen.

Tablet-style personal electronic devices may require a user to use both hands, particularly when trying to enter data on the on-screen keyboard. Because these devices are larger, a user may need to place the device on a table to enter the data. In addition, the larger size of these devices may cause a user's hands and arms to become tired when holding the device for a long period of time, such as when viewing a movie. One reason for the great popularity of tablet-style personal electronic devices is their portability. Smaller than a laptop, tablet-style devices feature screens that may be difficult to view under direct light or sunlight. In this situation the user may be forced to hold the device in an uncomfortable position in order to have the best viewing quality on the screen.

SUMMARY

In one aspect, apparatus and methods for supporting an electronic device include an electronic device storage chamber; a shoulder strap attached to a top end of the electronic device storage chamber; a chest strap attached to a surface of the electronic device storage chamber; a bottom arm hingeably attached to a bottom end of the electronic device storage chamber; a ball joint attached to the bottom arm; and an electronic device support arm having a first end attached to the ball joint.

Implementations of the above aspect may include one or more of the following. The bottom arm includes a plurality of segments and hinges rotatably connecting the segments. A lock can be provided for the hinge(s). The ball joint can be a friction ball joint. The ball joint can include a lock. A double hinge joint can be positioned at a second end of the electronic support arm and attached to the electronic device. A phone arm can be attached to a surface of the electronic device storage chamber. Double hinge joints can be connected to each end of the phone arm. A phone case can be attached to the phone arm. A phone pocket can be positioned near the bottom end of the electronic device storage chamber to receive the phone case for storage. A universal mount structure for a tablet can be attached to one end of the electronic device support arm, wherein the universal mount structure dimensions are adjustable to fit a variety of electronic devices. Four end caps can receive four corners of the electric device. A pivot can support each end-cap. A male portion can be inserted into a female portion, wherein the male portion includes two pivotable and extendible end-caps and wherein the female portion includes two pivotable and extendible end-caps. The male portion and the female portion are U-shaped to interlock with each other. A tab on the male portion snappably engages tracks on the female portion to secure the male and female portions together. The bottom arm can be compactly folded in a storage mode. The electronic device support arm height can be shortened in a storage mode. A phone case can be inserted into a phone pocket positioned near the bottom end of the electronic device storage chamber in a storage mode. A universal mount structure for a tablet can be attached to one end of the electronic device support arm and a universal mount structure for a telephone can be attached to one end of the electronic device storage chamber.

In another aspect, an apparatus for supporting an electronic device is provided in an embodiment. The attachment system includes a shoulder strap attached to a vertical leg of a support frame. A chest strap is also provided and is attached to two horizontal legs of the support frame. A lower joint is located between the two horizontal legs of the support frame. This lower joint allows the user to adjust the viewing angle of the screen of the electronic device. The electronic device attaches to an electronic device support leg that is attached to the lower joint. The end opposite the lower joint incorporates a ball joint. The ball joint allows the user to rotate the screen.

In yet another aspect, a method of supporting and attaching an electronic device is provided in a further embodiment. The method includes attaching an electronic device to an electronic device support leg, the support leg itself attached to a support frame. The user then adjusts the electronic device to the desired viewing position.

A further embodiment provides means for attaching an electronic device to an electronic device support leg attached to a support frame and means for adjusting the electronic device to a viewing position.

In a further aspect, method and apparatus for supporting a personal electronic device are provided. The device incorporates a support frame structure comprised of three legs. A vertical leg is attached to a shoulder strap, while the horizontal legs are attached to a chest strap. A lower joint is located between the two horizontal legs and this lower joint is also attached to an electronic device support leg. The electronic device support leg is attached to the lower joint and also to a ball joint at the end opposite the lower joint. In use, the lower joint allows for the electronic device to be moved into a viewing position at a desired angle. The ball joint allows rotation of the device between portrait and landscape orientations. A case may also be attached to the electronic device support leg to contain the personal electronic device.

Advantages of the preferred embodiment may include one or more of the following. The system provides a flexible, yet convenient and light weight support for a tablet style personal electronic device. The system is particularly desirable for hands-free use. Certain embodiments of the system support multiple devices, including a cellular phone and a tablet at once. The system has a storage mode where the arms and the tablet and/or phone are retracted into a compact configuration for storage purposes.

Various aspects and embodiments of the invention are described in further detail below.

BRIEF DESCRIPTION OF THE SEVERAL VIEWS OF THE DRAWINGS

The present invention described herein will become apparent from the following detailed description considered in connection with the accompanying drawings, which disclose several embodiments of the invention. It should be understood, however, that the drawings are designed for the purpose of illustration and not as limits of the invention.

DETAILED DESCRIPTION OF THE INVENTION

Figure 1:
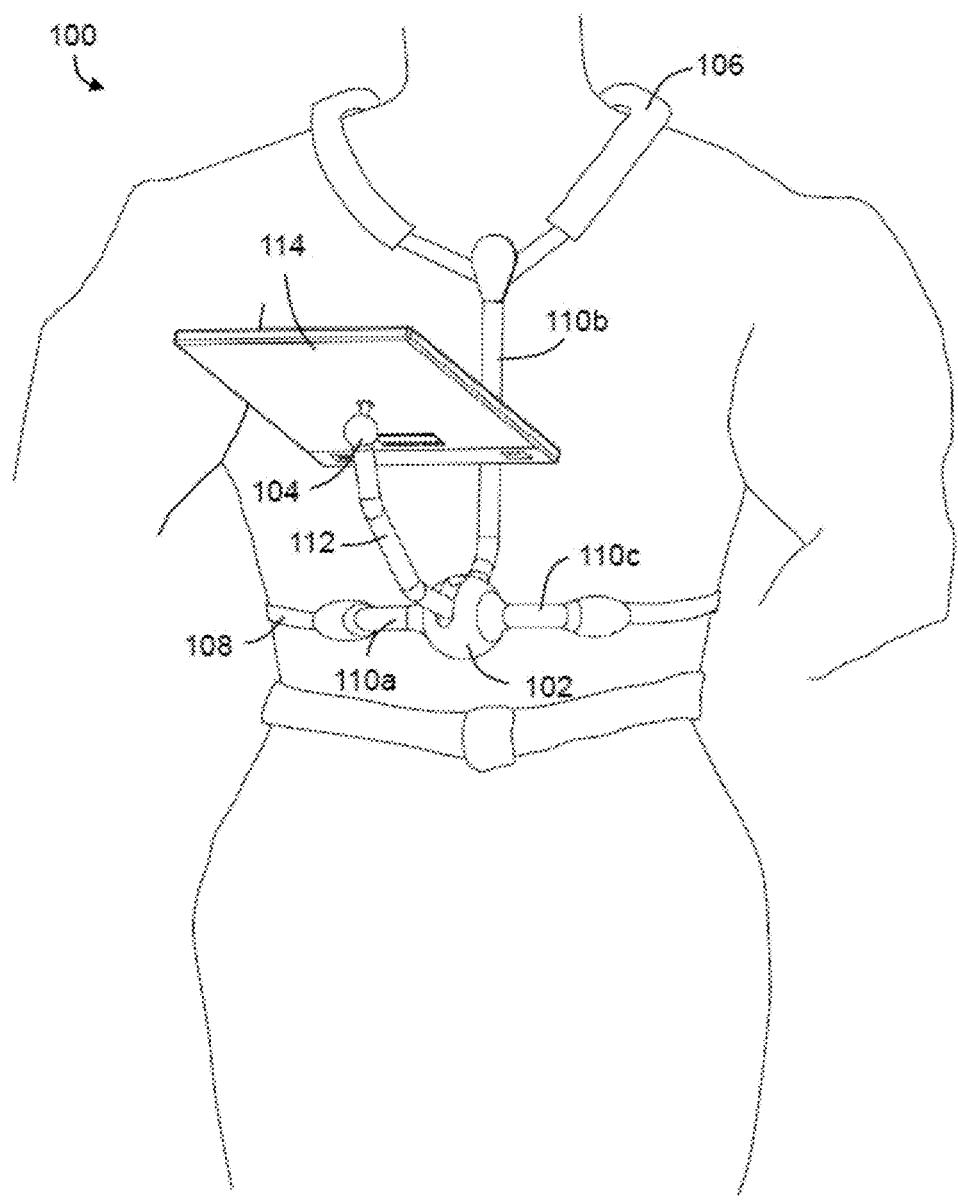
FIG. 1 illustrates an attachment system for a tablet style personal electronic device, according to an embodiment of the invention.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides for an efficient and convenient apparatus for hands-free use of a tablet style personal electronic device or other personal electronic device. The attachment system frees both hands to use the tablet-style personal electronic device. With the device supported by the attachment system of the present invention the user is free to type or move about.

FIG. 1 illustrates use of the device. The attachment system 100 includes lower joint 102, which provides a mechanism to raise and lower the tablet-style device 114 to adjust the viewing angle. Lower joint 102 is attached to two support legs 110a and 110c. When worn, support legs 110a and c are horizontal and generally parallel to the user's waist. Lower joint 102 allows movement in an up and down direction only, allowing adjustment of the screen viewing angle. The lower joint 102 is a friction hinge, allowing the user to set a position and have the tablet-style device 114 remain in the set position. Lower joint 102 also allows the tablet-style personal electronic device to be pushed against the user's chest to carry the device without concern of dropping it.

Lower joint 102 moves a tablet support leg 112 up and down. Tablet support leg 112 incorporates a ball joint 104 at the end of the tablet support leg 112 opposite lower joint 102. Ball joint 104 is a friction ball joint that allows rotation. Friction provides stabilization after the device is rotated. If needed a lock may be provided in ball joint 104. Since many tablet-style personal electronic devices may be used in either portrait or landscape orientation, the friction ball joint 104 permits a user to rotate the device to whichever orientation is necessary for the application in use.

The attachment system 100 is further stabilized by a support leg 110b, which forms the third leg of the support system, along with support legs 110a and c. Support leg 110b is longer and extends vertically up the user's chest. In contrast, support legs 110a and c extend horizontally as depicted in FIG. 1. Further stabilization and support for the attachment system is provided by shoulder strap 106. Shoulder strap 106 attaches to the upper end of support leg 110b. When worn support leg 110b and shoulder strap 106 form a "Y" pattern on the wearer's chest. Both chest strap 108 and shoulder strap 106 are adjustable to fit each user.

Figure 2:
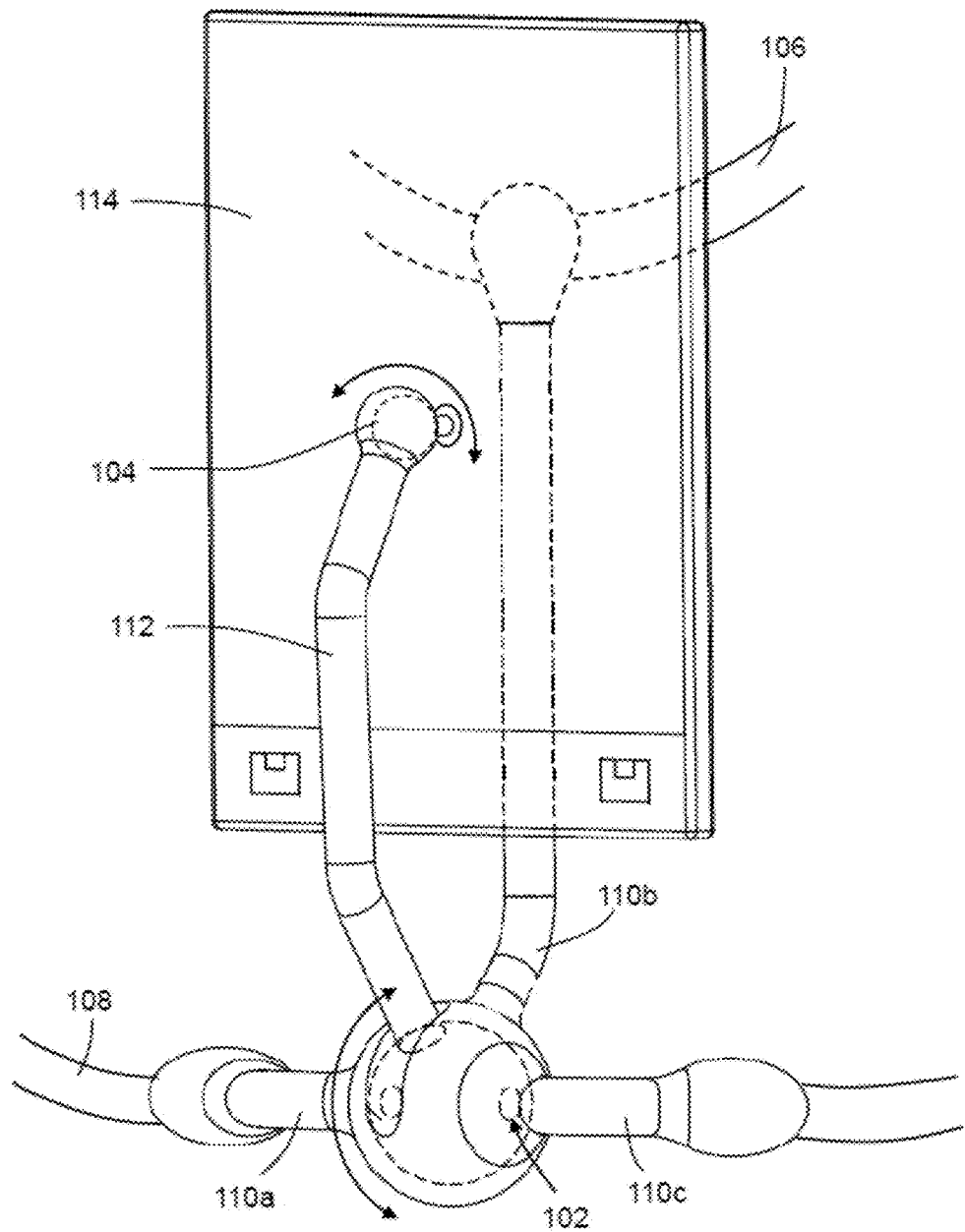
FIG. 2 provides a detailed view of the lower joint and ball joint of the attachment system for a tablet style personal electronic device according to an embodiment of the invention.

FIG. 2 illustrates the attachment system from the perspective of a user wearing the device. In FIG. 2, the tablet-style personal electronic device or other electronic device is shown in the carrying position, that is pushed up against the user's chest with the back of the device facing outward. In use, the tablet-style personal electronic device 114 is moved into the viewing position so that the screen is visible to the user. The double-headed arrow in FIG. 2 illustrates the direction of motion for lower joint 102. The chest strap 108 attaches to support legs 110a and 110c. This attachment may be by a variety of means, including but not limited to: threaded loop and stitching/gluing, clips, buckles, or other means. Support leg 110b is partially visible near the lower joint 102. Tablet support leg 112 is also attached to lower joint 102. Friction ball joint 104 attaches to the back of the tablet-style personal electronic device 114. This attachment to ball joint 104 may be by means of a pad with adhesive attached, but could also utilize a flat plate with straps to hold the device to the plate, a built-in pin (such as pin 304 of FIG. 3), or by means of a case. Any suitable means is contemplated. The double-headed arrow shown near friction ball joint 104 illustrates the direction of rotational movement of friction ball joint 104. Ball joint 104 allows further adjustment of the viewing angle and distance and also allows unlimited horizontal rotation of the screen.

Figure 3:
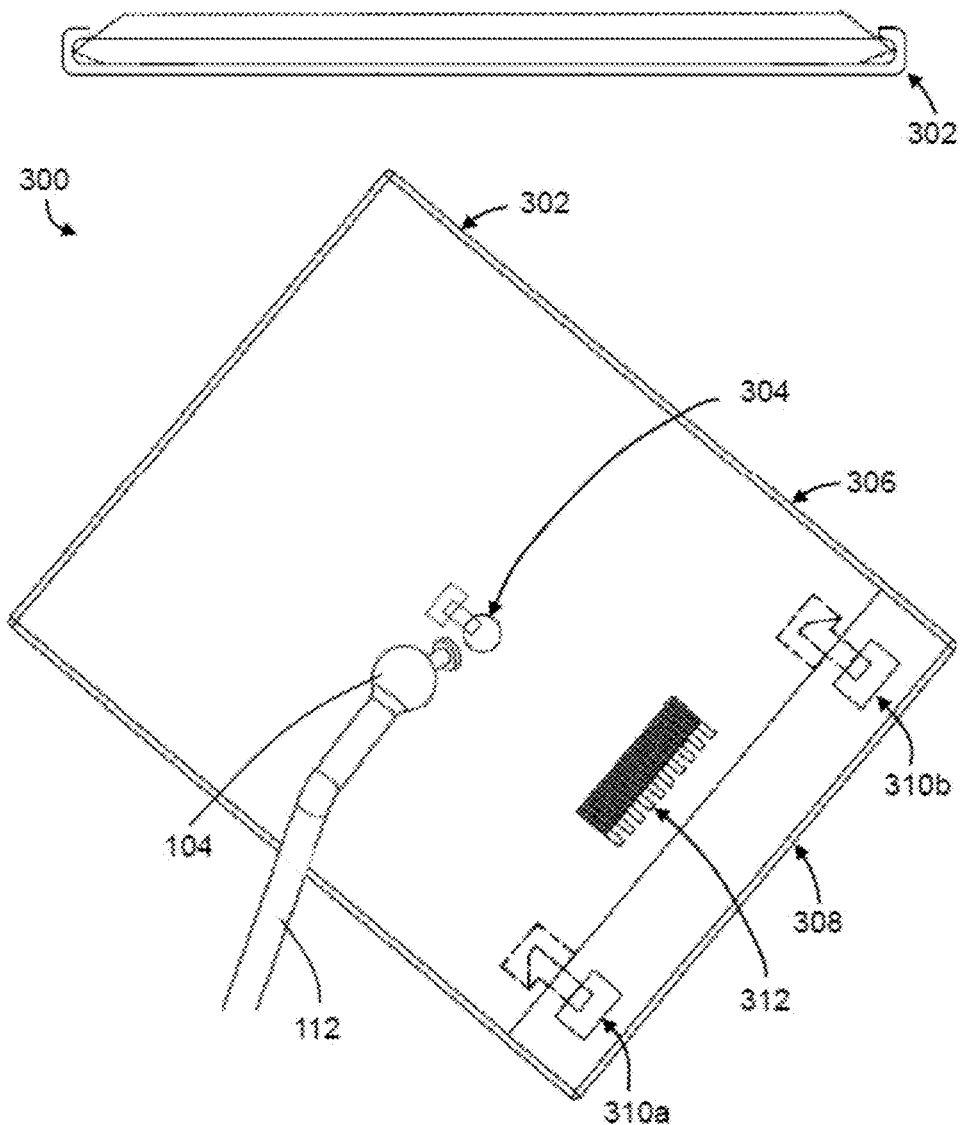
FIG. 3 depicts use of a case with the attachment system for a tablet style personal electronic device, according to an embodiment of the invention.

FIG. 3 illustrates use of a case that may be used in conjunction with the attachment system for a tablet style personal electronic device. The assembly 300 includes a case 302 that is attached to the shaft 112 of the ball joint 104. Case 302 may be detached and used separately. Case 302 may also be used as a cover by inserting the tablet style personal electronic device with the cover facing down. The connection between ball joint 104 and the back of case 302 may be locked in place using built in pin 304, located on the back of case 302. As illustrated in FIG. 3, the case 302 may be locked in place using built-in pin 304.

Lower portion 306 of case 302 may be separated to allow insertion of the tablet style personal electronic device. Locks 310a and 310b lock the tablet style personal electronic device in case 302. Indented handle 312 allows carrying of case 302.

Figure 4:
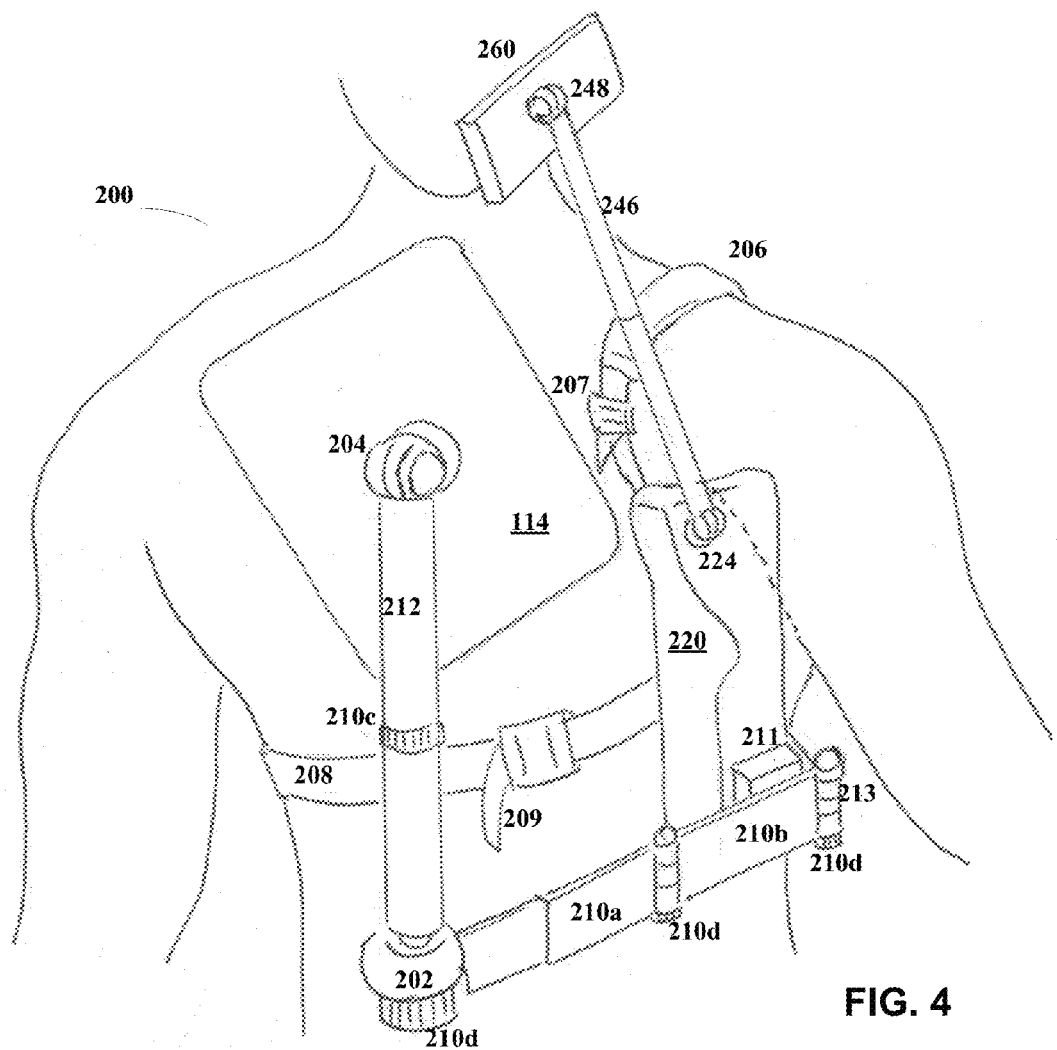
FIG. 4 illustrates another embodiment of an attachment system for a tablet style personal electronic device.

FIG. 4 illustrates use of another embodiment of an attachment system for a tablet style personal electronic device. In FIG. 4, an attachment system 200 includes lower joint 202, which provides a mechanism to raise and lower the tablet-style device 114 to adjust the viewing angle. Lower joint 202 is attached to two support legs 210a and 210b that in turn is connected to a hinge or joint 213. When worn, support legs 210a and 210b are horizontally extensible and retractable. Further, support legs 210a-210b are generally parallel to the user's waist, and can rotate along a horizontal axis via joints 213 unless locked by locks 210d. Phone pocket 211 is adjacent joint 213 and allows for storage of the phone. Lower joint 202, together with tablet support leg 212, allows movement in an up and down direction only, allowing adjustment of the screen viewing angle. The movable extension arm 212 can be tightened by locking nut 210c to securely adjust the viewing height of the tablet 114. The lower joint 202 is a friction ball joint, allowing the user to set a position and have the tablet-style device 114 remain in the set position. Lower joint 202 also allows the tablet-style personal electronic device 114 to be pushed against the user's chest to carry the device without concern of dropping the tablet. In one embodiment, lower joint 202 is a ball joint which is a friction ball joint that allows rotation. Friction provides stabilization after the device is rotated. Ball joint 202 allows the user to adjust the angle of arm 212 to position it vertically while in a seating position instead of standing up, or to adjust it due to the different waist sizes of users. If needed a lock 210d may be provided in ball joint 202.

Lower joint 202 moves a tablet support leg 212 up and down. Tablet support leg 212 incorporates double hinges 204 at the end of the tablet support leg 212 opposite lower joint 202. Double hinge joint 204 allows the tablet device 114 to be able to rotate in multiple planes. Since many tablet-style personal electronic devices may be used in either portrait or landscape orientation, the double hinge joint 204 permits a user to rotate the device to whichever orientation is necessary for the application in use.

The attachment system 200 is stabilized by tablet storage case or holster 220. Holster 220 provides rigid mechanical suspension for support legs 210a and 210b, which can swivel through joint 213. At one end of holster 220 is telephone joint 224, which is rotatably connected to extensible telephone support arm 246 at one end. Similarly, telephone joint 248 is rotatably connected to the other end of telephone support arm 246. Joints 224 and 248 are double hinge type joints to allow telephone case 260 to move in two axes and allow the arm 246 to move in two axes relative to holster 220.

Further stabilization and support for the attachment system is provided by shoulder strap 206 and lock 207. Shoulder strap 206 attaches to the upper end of holster 220. Chest strap 208 also as a lock 209 to secure the strap 208 to the body of the wearer. Both chest strap 208 and shoulder strap 206 are adjustable to fit each user prior to locking.

The device of FIG. 4 advantageously allows a user to talk on the phone in phone case 260 while working on the tablet 114. Moreover, the phone can be positioned at a fixed position for optimal sound capture. Further, the tablet can be fixedly positioned for optimal viewing or text entering. A user can talk on the phone and perform computer tasks on the tablet while he or she is walking, all with "hands-free" support.

Figure 5:
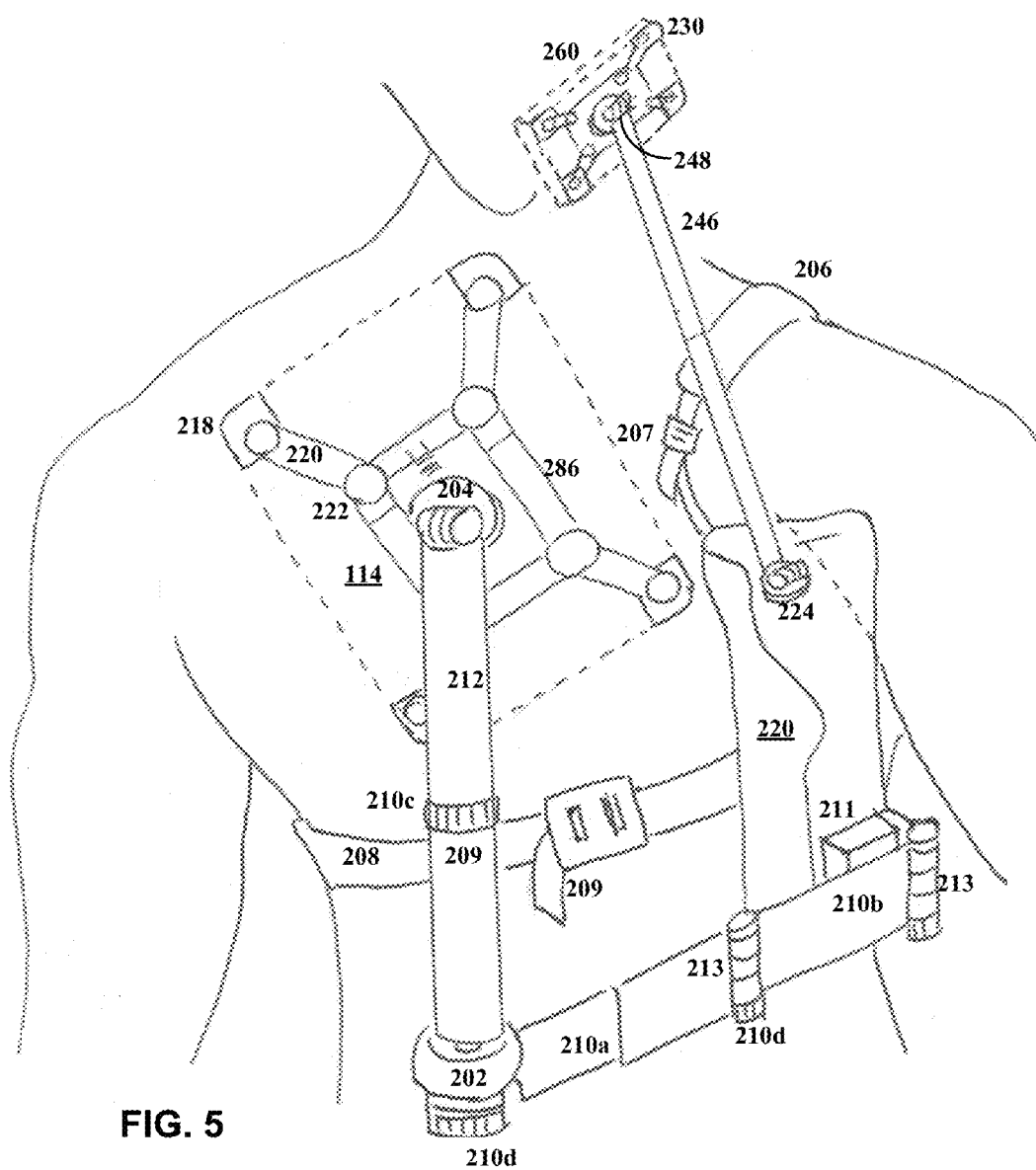
FIG. 5 illustrates a universal mount embodiment of an attachment system for a tablet style personal electronic device.

FIG. 5 illustrates a universal mount embodiment of an attachment system for a tablet style personal electronic device. The embodiment of FIG. 5 is similar to the embodiment of FIG. 4, with a universal structure for receiving different types of tablet device 114 and a second universal structure to receive cases 260 to hold various types of telephones.

Figures 6A, 6B:
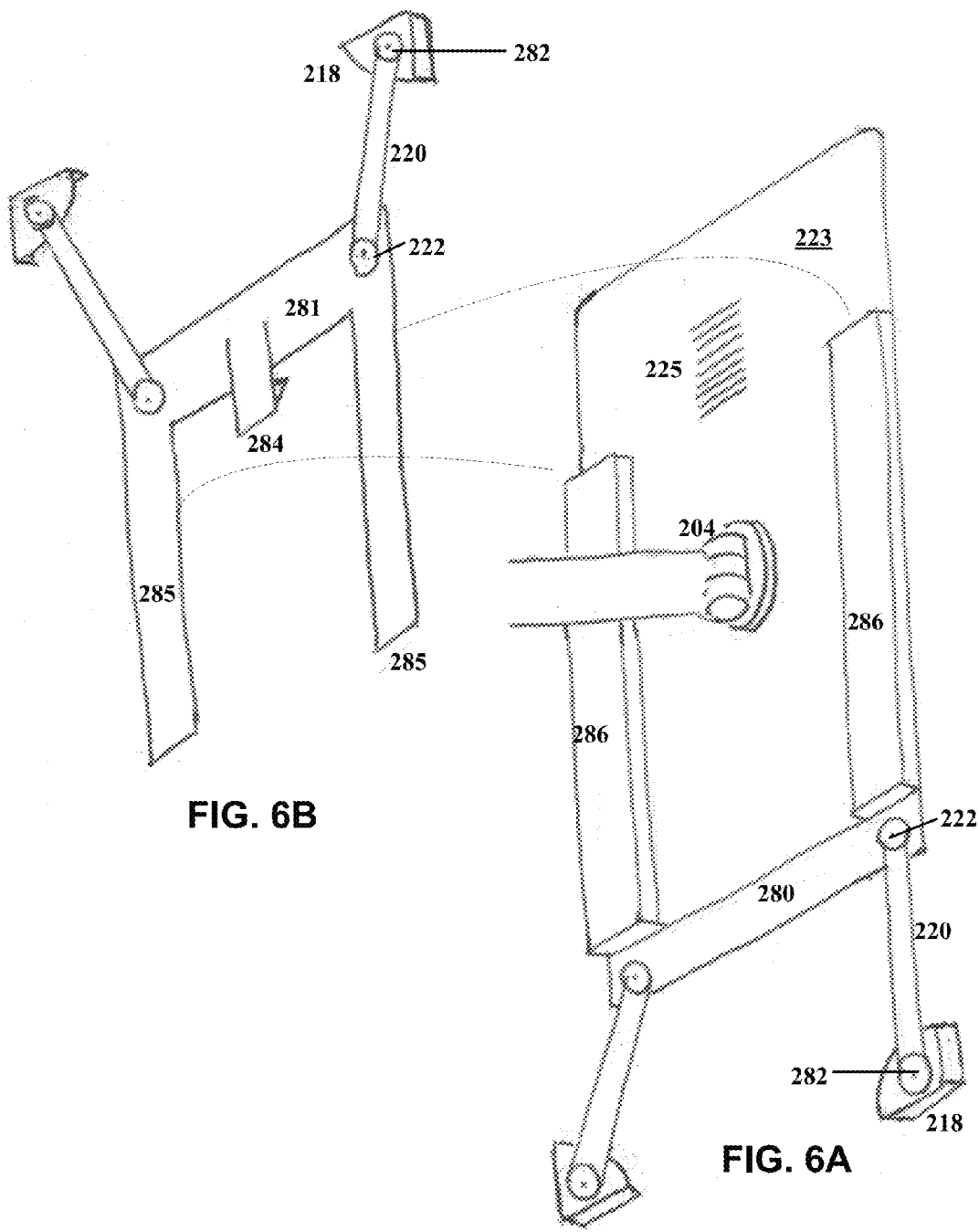
FIG. 6 provides a detailed view of the double hinges of the attachment system of FIG. 5.

FIG. 5 and FIGS. 6A-6B together show a universal structure that can be adjusted to hold various portable devices such as tablet 114. The universal structure has a female portion shown in FIG. 6A and a male portion shown in FIG. 6B. The male portion of FIG. 6B is adapted to be inserted into the female portion of FIG. 6A. The combination of male/female portions support four extendible/moveable end caps 218 that are fitted over the four corners of tablet 114 and then tightened to secure the four corners of tablet 114 to the universal structure of FIGS. 6A-6B in combination. Two of the end-caps 218 extend from arms 220 secured to end region 280 through pivots 222 and 282. End region 280 is positioned on a back plate 223 of the universal structure. Two elongated receptacles 286 are mounted on back plate 223 and adapted to receive a U-shaped male portion of FIG. 6B to form the universal structure. The U-shaped male portion includes prongs 285 extending from end region 281 of FIG. 6B. At each end of end region 281 are pivots 222 and 282 that allow arms 220 to pivotably be connected to the universal structure at one end and to end caps 218 at the other end of arms 220. Pivots 222 allow the universal structure to be able to accommodate different width/length of the tablet 114. Near the center of end region 281 is tab 284 that engages tracks 225 on back plate 223. Tab 284 slideably engages tracks 225 and holds the male/female portions together.

The universal structure 230 is constructed in a similar manner, but with reduced dimensions that are adjustable to fit various phone sizes instead of various tablet sizes. For example, the structure 230 can handle the iPhone, RIM phone, or Android phone, all of which have different dimensions.

Figure 7:
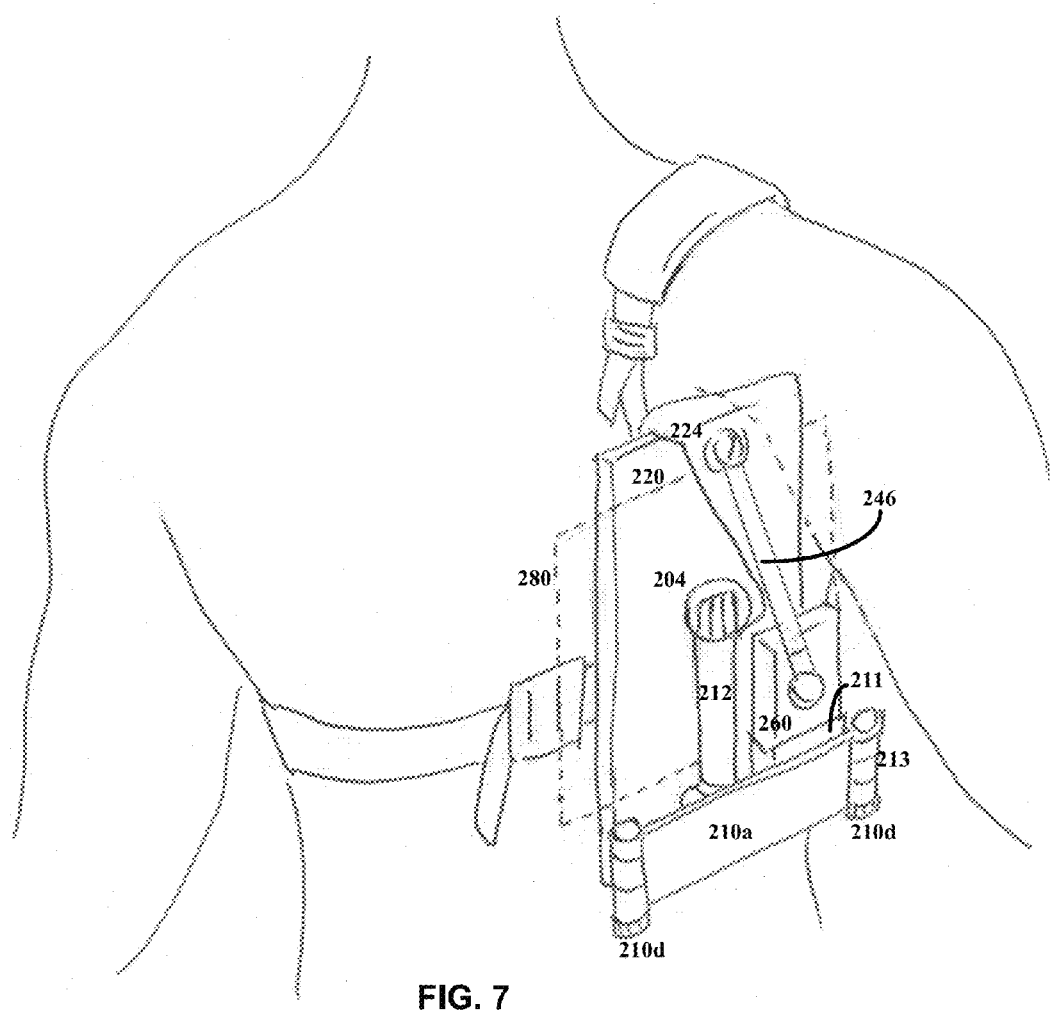
FIGS. 7-8 show exemplary views of the system of FIG. 4 with arms retracted in a storage mode.
Figure 8:
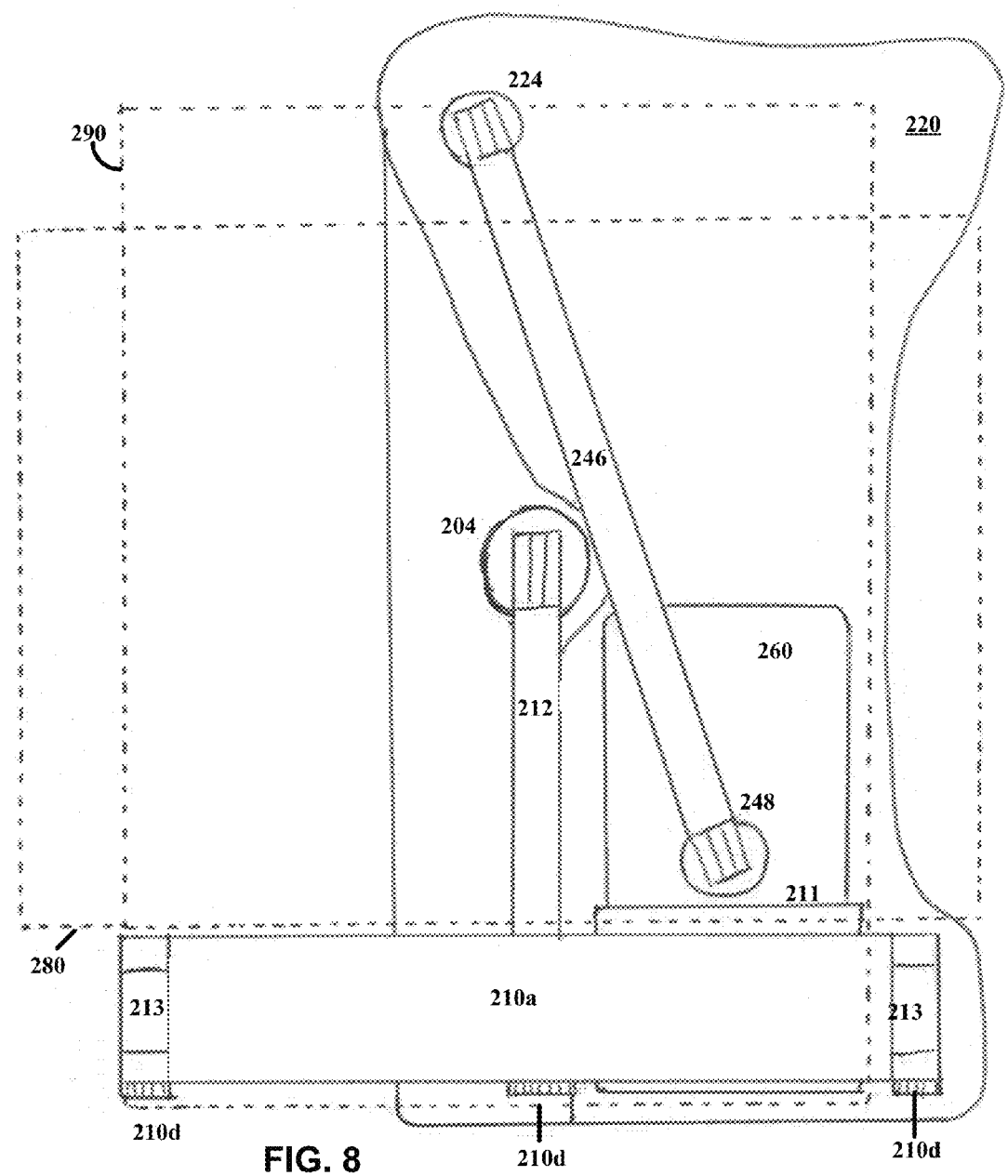

FIGS. 7-8 show exemplary views of the system of FIG. 4 with arms retracted in a storage mode. FIG. 7 shows the device of FIG. 4 in a retracted mode and worn under the arm through shoulder pad or strap 206. When retracted and compacted, the device of FIG. 4 can be worn on the shoulder like a brief case.

Viewing FIGS. 7-8 in combination, the tablet 114 can be stored in a portrait mode 290 or a landscape mode 280. Arm 246, along with phone case 260 is folded through double hinge joints 224 and 248 so that phone case 260 is inserted into phone storage 211. Arm 212 is vertically retracted into a compact shape, and bottom arm 210a is retracted. Locks 210d can be dialed to secure and prevent hinge 213 from opening.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and may further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for supporting an electronic device, comprising:
    an electronic device storage chamber;
    a shoulder strap attached to a top end of the electronic device storage chamber;
    a chest strap attached to a surface of the electronic device storage chamber;
    a bottom arm hingeably attached to a bottom end of the electronic device storage chamber;
    a ball joint attached to the bottom arm;
    an electronic device support arm having a first end attached to the ball joint; a phone arm attached to a surface of the electronic device storage chamber; and a phone pocket positioned near the bottom end of the electronic device storage chamber, wherein a phone attached to the phone arm can be folded into the phone pocket when not in use.

2. The apparatus of claim 1, wherein the ball joint comprises a friction ball joint.

3. The apparatus of claim 1, wherein the ball joint includes a lock.

4. The apparatus of claim 1, comprising a double hinge joint positioned at a second end of the electronic support arm and attached to the electronic device.

5. The apparatus of claim 1, comprising double hinge joints coupled to each end of the phone arm.

6. The apparatus of claim 1, further comprising a phone case coupled to the phone arm.

7. The apparatus of claim 1, further comprising a universal mount structure for a tablet coupled to one end of the electronic device support arm and a universal mount structure for a telephone coupled to one end of the electronic device storage chamber.

8. The apparatus of claim 1, wherein the bottom arm includes a plurality of segments and hinges rotatably connecting the segments.

9. The apparatus of claim 8, comprising a lock for each hinge.

10. The apparatus of claim 1, further comprising a universal mount structure for a tablet coupled to one end of the electronic device support arm, wherein the universal mount structure dimensions are adjustable to fit a variety of electronic devices.

11. The apparatus of claim 10, wherein the bottom arm is compactly folded in a storage mode.

12. The apparatus of claim 10, where the electronic device support arm height is shortened in a storage mode.

13. The apparatus of claim 10, wherein a phone case is inserted into a phone pocket positioned near the bottom end of the electronic device storage chamber in a storage mode.

14. The apparatus of claim 10, further comprising four end caps coupled to four corners of the electric device.

15. The apparatus of claim 14, further comprising a pivot coupled to each end cap.

16. The apparatus of claim 10, further comprising a male portion adapted to be inserted into a female portion, wherein the male portion includes two pivotable and extendible end caps and wherein the female portion includes two pivotable and extendible end caps.

17. The apparatus of claim 16, further comprising a tab on the male portion that snappably engages tracks on the female portion to secure the male and female portions together.

18. A method for supporting an electronic device, comprising:
- strapping an electronic device storage chamber to a user through a shoulder strap attached to a top end of the electronic device storage chamber and a chest strap attached to a surface of the electronic device storage chamber;
- adjusting a bottom arm hingeably attached to a bottom end of the electronic device storage chamber;
- mounting an electronic device on a support arm attached to the bottom arm through a ball joint;
- moving the electronic device to any three-dimensional (3D) position relative to the user and maintaining the 3D position in a hands-free manner; mounting a telephone to a telephone support arm extending from the electronic device storage chamber and positioning and maintaining the telephone in a telephone position in a hands-free manner; folding the telephone into a telephone pocket when not use; and folding the bottom arm and support arm into a compact position for storage.

* * * * *